United States Patent [19]

Quinn

[11] Patent Number: 4,665,117

[45] Date of Patent: May 12, 1987

[54] BASIC METAL SALTS HAVING IMPROVED COLOR AND STABILITY AND VINYL HALIDE POLYMERS CONTAINING SAME

[75] Inventor: Robert E. Quinn, Cleveland, Ohio

[73] Assignee: The Lubrizol Corporation, Wickliffe, Ohio

[21] Appl. No.: 811,587

[22] Filed: Dec. 20, 1985

[51] Int. Cl.$^4$ .................................................. C08K 5/13
[52] U.S. Cl. ................................ 524/327; 252/400.61; 252/400.62; 260/414
[58] Field of Search ................. 260/414; 252/400 R, 252/389.61, 389.62, 400.61, 400.62; 524/327

[56] References Cited

U.S. PATENT DOCUMENTS

| | | | |
|---|---|---|---|
| 2,015,115 | 9/1935 | Kyrides | 568/650 |
| 2,616,904 | 11/1952 | Asseff et al. | 260/399 |
| 2,760,970 | 8/1956 | Le Suer | 260/429 |
| 2,767,164 | 10/1956 | Asseff et al. | 260/139 |
| 2,798,852 | 7/1957 | Wiese et al. | 252/42.7 |
| 2,802,816 | 8/1957 | Asseff et al | 260/139 |
| 2,881,206 | 4/1959 | Kjonaas et al. | 252/400.61 |
| 2,968,642 | 1/1961 | Le Suer | 260/45.75 |
| 2,971,014 | 2/1961 | Mastin | 260/398 |
| 2,989,463 | 6/1961 | Mastin | 252/25 |
| 3,027,325 | 3/1962 | McMillen et al. | 252/33 |
| 3,031,284 | 4/1962 | Andress, Jr. | 44/76 |
| 3,147,232 | 11/1964 | Norman | 260/23 |
| 3,194,823 | 7/1965 | Le Suer | 260/414 |
| 3,342,733 | 9/1967 | Robbins et al. | 252/33 |
| 3,533,975 | 10/1970 | Scullin | 260/23 |
| 3,773,664 | 11/1973 | Le Suer | 252/40.7 |
| 3,779,922 | 12/1973 | Le Suer | 252/34.7 |
| 4,159,973 | 7/1979 | Hoch et al. | 260/414 |
| 4,177,187 | 12/1979 | Bohen | 524/180 |
| 4,252,698 | 2/1981 | Ito et al. | 260/18 |

FOREIGN PATENT DOCUMENTS 0047894  11/1985  European Pat. Off.

*Primary Examiner*—Veronica P. Hoke
*Attorney, Agent, or Firm*—Forrest L. Collins; James L. Cordek; Denis A. Polyn

[57] ABSTRACT

In accordance with the present invention, it has been found that the color and stability of basic alkali and alkaline earth metal salts prepared from mixtures containing a phenol can be improved by conducting the reaction in the absence of free oxygen and thereafter post-treating the reaction product with at least one compound capable of displacing the hydrogen of the phenolic hydroxyl groups present in the mixture while maintaining oxygen free atmosphere. Generally, the metal salts will be alkaline earth metal salts of phenols such as calcium and barium salts. A preferred example of the compound capable of displacing the hydrogen of the phenolic hydroxyl group is an epoxide such as ethylene oxide and propylene oxide.

38 Claims, No Drawings

BASIC METAL SALTS HAVING IMPROVED COLOR AND STABILITY AND VINYL HALIDE POLYMERS CONTAINING SAME

BACKGROUND OF THE INVENTION

This invention relates to a novel method for the preparation of basic metal salt stabilizer compositions for vinyl halide polymers, the stabilizer compositions so prepared, and to vinyl halide polymers stabilized therewith. More particularly, the invention relates to a process for preparing lighter colored hydrocarbon-soluble basic alkali and alkaline earth metal salts of alkyl phenols and/or monocarboxylic acids where phenols are used as promoters.

Many organic polymers, more particularly halogen containing organic polymers are conveniently and economically processed into useful articles of commerce by methods employing heat to melt or soften the polymer. The use of such heat can be and often is detrimental to the polymer, especially where the polymer is exposed to high (100° C. to 200° C.) processing temperatures for any extended period of time. It is well known that many organic polymers, including halogen containing organic polymers, will undergo color changes and various physical changes upon exposure to high temperatures over a period of time unless properly protected. The color change is gradual but visually perceptable during short-term exposure to high processing temperatures, but on exposure to high processing temperatures the change in color accelerates and becomes greater in intensity. Color changes occuring during the first several minutes of exposure to high processing temperatures are commonly referred to as early color or early discoloration. Avoidance of such early color or early discoloration is particularly important where white or light colored products are to be produced. It is of course also important to prevent or reduce discoloration and deterioration of the organic polymer during extended exposure to high processing temperatures as may be encountered in some processes or fabricating methods.

A variety of stabilizer systems have been suggested and used to inhibit or prevent this deterioration. These stabilizer systems are for the most part presumed to act in such a manner as to neutralize hydrogen halide that is generated to prevent further dehydrohalogenation because of the presence of free hydrogen halide. Among the stabilizer systems that have been suggested and used in the prior art are oil-soluble neutral and basic salts of such metals as barium, cadmium, zinc, zirconium, tin, calcium. Generally, the above metal salt stabilizers are used in combination with one or more organic phosphites.

A variety of oil-soluble salts of monovalent and polyvalent metals have been utilized as stabilizers for vinyl halide polymers. The metals include the alkaline earth metals, zinc, calcium, tin, barium, aluminum, strontium, zirconium and magnesium. The metal salts may be neutral salts although basic or "overbased" metal salts are preferred since these contain larger amounts of the metal. In some applications, mixtures of neutral and basic metal salts are utilized such as mixtures of neutral cadmium carboxylates with overbased barium phenates, carboxylates and/or sulfonates.

U.S. Pat. No. 4,159,973 describes stabilizer systems for vinyl halide resin compositions which comprise mixtures of (a) specified overbased barium salt complexes that are compatible with epoxidized vegetable oil, (b) a polyvalent metal salt component, (c) at least one organic phosphite, and (d) an aromatic or aliphatic hydrocarbon solvent. Examples of the polyvalent metal salts include cadmium, zinc, zirconium, tin and calcium salts of aromatic as well as aliphatic carboxylic acids. It is reported that vinyl halide resin compositions containing such stabilizer systems are characterized by excellent heat and light stability, color and clarity.

An anti-yellowing additive for stabilizing vinyl chloride polymers is described in U.S. Pat. No. 4,252,698. The additive comprises the mixture of at least one overbased sulfonate or phenolate compound of lithium, sodium, potassium, magnesium, calcium, strontium, barium, zinc, titanium, aluminum, zirconium or tin, and a 1,3-di-ketone compound having about 5 to about 30 carbon atoms or a metal salt thereof wherein the metal may be any one of the metals described above for the overbased sulfonate or phenolate compound.

U.S. Pat. No. 3,194,823 describes barium and cadium-containing organic complexes useful in stabilizing halogen-bearing polymeric compositions. In general, the complexes are prepared from a mixture comprising (a) an alcohol, (b) an aliphatic monocarboxylic acid compound, and (c) a mixture of barium and cadmium bases optionally in the presence of a phenol.

The polyvalent metal components of the stabilizers which have been utilized for vinyl halide polymers usually contain a barium compound which may be a salt of a monocarboxylic acid such as octanoic acid, neodecanoic acid, or naphthenic acid; a salt of an alkyl phenol such as octyl phenol, nonyl phenol, etc.; or an overbased barium salt complex. The use of overbased barium salt complexes has increased in recent years because the overbased salts contain high amounts of barium such as, for example, 12 to 30% barium or higher.

Overbased barium salt complexes are well known, and various procedures for preparing such overbased barium salt complexes from carboxylic acids, sulfonic acids and alkyl phenols using an acidic gas such as carbon dioxide or sulfur dioxide to reduce the basicity are disclosed in, for example, the following U.S. Pat. Nos.: 2,616,904; 2,760,970; 2,767,164; 2,798,852; 2,802,816; 3,027,325; 3,031,284; 3,342,733; 3,533,975; 3,773,664; and 3,779,922.

While many overbased barium salts such as the overbased barium alkyl phenate complexes described in some of the above patents are effective stabilizers for vinyl halide polymers, they often are dark in color and cannot be utilized when light colored vinyl halide polymers are desired. When dark colored stabilizers are added to vinyl halide polymer formulations, the color is carried over into the finished polymer rendering the polymer unsatisfactory when and clear polymers are desired.

SUMMARY OF THE INVENTION

In accordance with the present invention, it has been found that the color and stability of basic alkali and alkaline earth metal salts prepared from mixtures containing a phenol can be improved by conducting the reaction in the absence of free oxygen and thereafter post-treating the reaction product with at least one compound capable of displacing the hydrogen of the phenolic hydroxyl groups present in the mixture while maintaining oxygen free atmosphere. Generally, the metal salts will be alkaline earth metal salts of phenols such as calcium and barium salts. A preferred example of the compound capable of displacing the hydrogen of the phenolic hydroxyl group is an epoxide such as ethylene oxide and propylene oxide.

The invention of this application also relates to the improved metal salts prepared in accordance with the process of the invention. Vinyl halide polymer compositions comprising a vinyl halide polymer and a stabilizing amount of the metal salts of the invention also are described and claimed.

DESCRIPTION OF THE PREFERRED EMBODIMENTS

The process of the first present invention for improving the color and stability of basic alkali and alkaline earth metal salts prepared from mixtures containing a phenol comprises the steps of (A) preparing, in the absence of free oxygen, a mixture (A-1) comprising
   (A-1-1) at least one alkali or alkaline earth metal base, and
   (A-1-2) at least one alkyl phenol, the ratio of the equivalents of said alkali or alkaline earth metal base to the alkyl phenol being greater than 1:1, or
a mixture (A-2) comprising
   (A-2-1) at least one alkali or alkaline earth metal base,
   (A-2-2) at least one phenol,
   (A-2-3) at least one monocarboxylic acid, and
   (A-2-4) optionally at least one aliphatic alcohol, the ratio of equivalents of monocarboxylic acid to phenol being at least about 1.1:1, and the ratio of equivalents of the metal base to the combination of the other components being greater than 1:1, (B) treating said mixture with an acidic gas in the absence of free oxygen until the titratable basicity (phenolphthalein indicator) of the mixture has been substantially reduced, and (C) treating the mixture with at least one compound capable of displacing the hydrogen of the phenolic hydroxyl groups present in the mixture in the absence of free oxygen.

It is preferred that the entire process involving steps (A), (B) and (C) be conducted in the absence of free oxygen since the presence of oxygen or oxidizing agents results in more highly colored product. Generally, the process is conducted in an atmosphere of nitrogen.

A second critical feature of the method of the present invention is step (C) wherein the basic metal salt which is produced as an intermediate at the conclusion of step (B) is treated with a compound capable of displacing the hydrogen of any phenolic hydroxyl groups present in the mixture. If the phenolic hydroxyl groups are not displaced in accordance with the method of the present invention, the product obtained by the process is darker in color and, on standing, continues to darken in color. When the process of the present invention is followed, the initial product is light in color and does not appreciably darken on standing.

Throughout this specification and claims, the term "basic" as applied to the alkali or alkaline earth metal salts is used to refer to metal compositions wherein the ratio of total metal contained therein to the organic moieties is greater than the stoichiometric ratio of the neutral metal salt. That is, the number of metal equivalents is greater than the number of equivalents of the organic moiety. In some instances, the degree to which excess metal is found in the basic metal salt is described in terms of a "metal ratio". Metal ratio as used herein indicates the ratio of total of alkali or alkaline earth metal in the oil-soluble composition to the number of equivalents of the organic moiety. The basic metal salts often have been referred to in the art as "overbased" or "superbased" to indicate at the presence of an excess of the basic component.

The process of the present invention may be used to prepare lighter colored basic salts of phenates and carboxylates. When basic alkali or alkaline earth metal salts of alkyl phenols are desired, the mixture utilized in step (A) comprises
   (A-1-1) at least one alkali or alkaline earth metal base, and
   (A-1-2) at least one alkyl phenol, the ratio of the equivalents of said alkali or alkaline earth metal base to the alkyl phenol being greater than 1:1.

When the desired basic metal salt is a salt of a monocarboxylic acid, the mixture utilized in step (A) of the process comprises
   (A-2-1) at least one alkali or alkaline earth metal base,
   (A-2-2) at least one phenol,
   (A-2-3) at least one monocarboxylic acid, and
   (A-2-4) optionally at least one aliphatic alcohol, the ratio of equivalents of monocarboxylic acid to phenol being at least about 1.1:1, and the ratio of equivalents of the metal base to the combination of the other components being greater than 1:1.

The mixtures utilized in step (A) of the process of the present invention are prepared and maintained in the absence of free oxygen. An atmosphere of nitrogen is preferred.

The alkali or alkaline earth metal bases utilized as component (A-1-1) and (A-2-1) may be derived from any of the alkali or alkaline earth metals. Metal bases derived from alkaline earth metals are preferred, and of these, the calcium and barium bases are particularly preferred. The metal bases include the metal oxides and hydroxides, and in some instances, the sulfides, hydrosulfides, etc.

The mixtures which are prepared in step (A) also contain at least one alkyl phenol (A-1-2) or phenol (A-2-2).

The alkyl phenol reactant (A-1-2) may be derived from phenol itself or from naphthol, or from other polynuclear phenolic compounds. It may also be a bisphenol such as is obtained from the condensation of an aldehyde with a phenol. The alkyl phenols may contain one or more alkyl groups on the aromatic nucleus, and it is necessary that the number of carbon atoms in the alkyl groups be sufficient to yield oil-soluble overbased metal phenates. Thus, the alkyl groups on the alkyl phenol will contain a total of at least 6 carbon atoms, and generally will contain up to about 150 carbon atoms. If there is only one alkyl group on the alkyl phenol, the alkyl group will contain at least about 6 carbon atoms, but if there are two alkyl groups, the sum of the carbon atoms in the two alkyl groups will equal at least about 6. For example, one alkyl group may contain 2 carbon atoms and the other alkyl group 4 carbon atoms. Specific examples of alkyl groups containing at least 6 carbon atoms include hexyl, isoheptyl, diisobutyl, n-decyl, tetrapropyl, octadecyl, polyisobutyl (derived from polyisobutene fractions of various molecular weights) dedecyl, etc. Specific examples of alkyl phenols which are contemplated for use in the preparation of overbased phenates useful in the process of the present invention include hexylphenol, heptylphenol, octylphenol, dodecylphenol, octadecylphenol, nonylphenol, and higher alkylated phenols; octylnaphthol, dodecylnaphthol, and higher alkylated naphthols; a condensation product of formaldehyde and two moles of octylphenol, or a condensation product of acetone and two moles of heptylphenol, etc.

The alkylphenol useful in the preparation of the overbased phenates may contain other groups in addition to the alkyl groups. Thus, halogen, nitro, alkoxy, etc. groups may be present.

The phenols (A-2-1) which are present in the mixture (A-2) include principally substituted and unsubstituted monohydric or polyhydric phenols. The substituents may be organic and/or inorganic. Examples of such phenols include phenol itself and alkylated and cycloalkylated mononuclear or polynuclear phenols containing from one to 150 or more carbon atoms in the substituent group or groups such as, for example, ortho-, meta-, and para-cresols; xylenols; para-ethylphenol; ortho, para-diethylphenol; n-propylphenol; para-isopropylphenol; tertiary butylphenol; n-amylphenol; para-tertiary amylphenol; para-cyclopentylphenol; cyclohexylphenol; methylcyclohexylphenol; secondary-hexylphenol; heptylphenol; diisobutylphenol; 3,5,5-trimethyl-n-hexylphenol; n-decylphenol; cetylphenol; oleylphenol; wax-alkylated phenol; polyisobutene-substituted phenol in which the polyisobutene substituent contains from about 20 to about 150 carbon atoms, etc; aryl-substituted phenols such as phenylphenol, diphenylphenol, and naphthylphenol; polyhydroxy aromatic compounds such as alizarin, quinizarin, hydroquinone, catechol, pyrogallol, etc.; monohydroxy naphthalenes such as alpha-naphthol and beta-naphthol; polyhydroxy naphthalenes such as naphthohydroquinone and naphthoresorcinol; alkylated polyhydroxy aromatic compounds such as octylcatechol and mono-(triisobutyl)pyrogallol; and substituted phenols such as para-nitrophenol, picric acid, ortho-chlorophenol, tertiarybutyl chlorophenols, para-nitro ortho-chlorophenol, para-aminophenol, etc. In most instances the phenol, if used, will be a mono-alkyl phenol containing from about 4 to about 12 carbon atoms in the alkyl group. Thus, commercially available mono-alkyl phenols such as para-tertiary butylphenol, heptylphenol, nonylphenol and diisobutylphenol (i.e., tertiary octylphenol) are preferred.

In addition to the alkali or alkaline earth metal base and the phenol, the mixture (A-2) also contains (A-2-3) at least one monocarboxylic acid.

The monocarboxylic acids may be aliphatic or aromatic monocarboxylic acids of mixtures thereof. Among the aliphatic monocarboxylic acids which can be utilized in the present invention are the aliphatic monocarboxylic acids containing an average of at least about 6 carbon atoms and more generally an average of from about 6 to about 30 carbon atoms. In most instances the monocarboxylic acid of the aliphatic monocarboxylic acid will be at least one substituted or unsubstituted aliphatic monocarboxylic acid such as n-hexanoic acid, capric acid, caprylic acid, 2-ethylhexanoic acid, undecanoic acid, lauric acid, myristic acid, palmitic acid, stearic acid, oleic acid, linoleic acid, linolenic acid, tung oil acids, tall oil acids, ricinoleic acid, 3,5,5-trimethyl-hexanoic acid, alpha-chlorostearic acid, alpha-nitrolauric acid, omega-amino-pentadecanoic acid, lauroxy-acetic acid, eicosanoic acid, mono-lauryl adipate, phenyloleic acid, phenylstearic acid, chlorophenylstearic acid, xylylstearic acid alpha-pyridyloleic acid, tetracosanoic acid, behenic acid, stearolic acid, etc. A preference is expressed for the higher fatty acids such as lauric, palmitic, oleic, linoleic, linolenic, stearic, myristic, palmitic, etc., acids and mixtures of fatty acids containing an average of at least about 12 carbon atoms.

The monocarboxylic acid also may be an aromatic monocarboxylic acid such as alkyl aromatic carboxylic acids and hydroxy-substituted aromatic carboxylic acids. The alkyl aromatic carboxylic acids may contain one or more alkyl groups such as butyl, hexyl, heptyl, octyl, dodecyl, octadecyl, etc. Generally, the total number of carbon atoms in the alkyl group(s) is at least 6 and will generally range from about 6 to about 150 carbon atoms in the alkyl groups. The aromatic carboxylic acids also may contain one or more hydroxyl groups attached to the aromatic moiety. Specific examples of such aromatic carboxylic acids include benzoic acid, salicyclic acid, 4-hexylbenzoic acid, etc.

The mixture (A-2) useful in step (A) in the process of the present invention optionally may contain (A-2-4) at least one aliphatic alcohol which serves as a promoter in the overall process. The alcohols which are useful as promoters include any one of the various available substituted or unsubstituted aliphatic or cycloaliphatic alcohols containing from 1 to about 20 or more carbon atoms. In most cases, the alcohol will be unsubstituted, i.e., it will conform to the formula ROH, where R is an aliphatic hydrocarbon radical or cycloaliphatic hydrocarbon radical containing from 1 to 20 carbon atoms. However, in some instances, the alcohol may contain organic and/or inorganic substituents such as aromatic groups, homocyclic groups, heterocyclic groups, and nitro, ether, ester, sulfide, keto, amino, nitroso, etc., groups.

Examples of alcohols useful as promoters include methanol, ethanol, n-propanol, isopropanol, n-butanol, isobutanol, n-pentanol-1, n-pentanol-2, isoamyl alcohol, n-hexanol-1, n-hexanol-2, 4-methylpentanol-2, n-heptanol, primary isooctanol (prepared for example, by the well known Oxo process), 2-ethylhexanol, n-octanol, 3,5,5-trimethyl-hexanol, cyclohexanol, methylcyclohexanol, ethylcyclohexanol, benzyl alcohol, beta-phenethyl alcohol, 2-alpha-pyridyl-ethanol-1, tetrahydrofurfuryl alcohol, 2-cyclohexyl-ethanol-1, n-decanol, lauryl alcohol, isododecanol (prepared for example, by the hydration of triisobutylene), myristyl alcohol, oleyl alcohol, n-eicosanl, n-tricosanol, n-triacontanol, 2-phenoxy-ethanol-1, 2-phenoxyethoxyethanol-1, 6-chloro-n-hexanol-1, 8-nitro-n-octanol-1, 4-aminocyclohexanol, ethylene glycol mono-oleate, glyceryl dipalmitate, 2-n-butoxy-ethanol-1, diethylene glycol mono-ethyl ether, 2-thiobutoxy-ethanol-1, etc. Of the various available alcohols, a preference is expressed for the aliphatic monohydric alcohols. Particularly preferred are the alkanols containing from about 12 to about 18 carbon atoms. In lieu of a single alcohol, mixtures of two or more different alcohols may also be used.

The amount of the phenol (A-2-2) and optionally the alcohol (A-2-4) included in the mixture (A-2) as a promoter is not critical. The promoters are included in the mixture to contribute to the utilization of the acidic gas during treatment of the mixture with the acidic gas. Generally, at least about 0.1 equivalent and preferably from about 0.05 to about 10 equivalents of the phenol (and the alcohol if present) per equivalent of a monocarboxylic is employed. Larger amounts, for example, up to about 20 to about 25 equivalents of alcohol and/or phenol may be used, especially in the case of lower molecular weight alcohols and phenols. Water, which may optionally also be present in the mixture, may be present as water added as such to the mixture, or the water may be present as "wet alcohol", "wet" phenol, hydrates of the alkali or alkaline earth metal salts, or other type of chemically combined water with the metal salts.

In addition to the components described above, the reaction mixtures used to prepare the basic metal salts ordinarily will contain a diluent. Generally, any hydrocarbon diluent can be employed, and the choice of diluent is dependent in part on the intended use of the mixture. Most generally, the hydrocarbon diluent will be a non-volatile diluent such as the various natural and synthetic oils of lubricating viscosity. The natural oils include animal oils and vegetable oils (e.g., castor oil, lard oil) as well as solvent-refined or acid-refined mineral lubricating oils of the paraffinic, naphthenic or mixed paraffinic-naphthenic types. Kerosene can be used. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.). Other classes of synthetic oils include alkylene oxide polymers and interpolymers and derivatives thereof; esters of dicarboxylic acids; silicon-based oils; etc.

The amount of basic alkali or alkaline earth metal base utilized in step (A-1) for the preparation of basic phenates is an amount which is more than one equivalent of the base per equivalent of phenol, and more generally, will be an amount sufficient to provide at least three equivalents of the metal base per equivalent of alkyl phenol. Larger amounts can be utilized to form more basic compounds, and the amount of metal base included may be any amount up to that amount which is no longer effective to increase the proportion of metal in the product.

When preparing the mixture (A-2), the amount of phenol (A-2-2) and the optional alcohol (A-2-4) included in the mixture is not critical except that the ratio of equivalents of monocarboxylic acid to phenol should be at least about 1.1:1; that is, the monocarboxylic acid is present in excess with respect to the phenol. The ratio of equivalents of the metal base of the combination of the other components in mixture (A-2) should be greater than 1:1 in order to provide a basic product. More generally, the ratio of equivalents will be at least 3:1.

The second step of the process of the present invention (B) involves treating the mixtures (A-1) or (A-2) described above with an acidic gas in the absence of free oxygen until the titratable basicity of the mixture has been substantially reduced. The titratable basicity is determined using a phenolphthalein. Generally, the titratable basicity is reduced to a base number below about 10.

The first two steps of the process of the present invention require no unusual operating conditions other the exclusion of free oxygen. The ingredients in step (A) are mixed, generally heated and then treated with the acidic gas, and the mixture may be heated to a temperature which is sufficient to drive off some of the water contained in the mixture. The treatment of the mixture with the acidic gas preferably is conducted at elevated temperatures, and the range of temperatures used for this step may be any temperature above ambient temperature up to about 200° C., and more preferably from a temperature of about 75° C. to about 200° C. Higher temperatures may be used such as 250° C., but there is no apparent advantage in the use of such higher temperatures. Ordinarily, a temperature of about 150° C. is satisfactory.

By the term "acidic gas" as used in this specification and in the claims is meant a gas which upon reaction with water will produce an acid. Thus, such gases as sulfur dioxide, sulfur trioxide, carbon dioxide, carbon disulfide, hydrogen sulfide, etc. are exemplary of the acidic gases which are useful in the process of this invention. Of these acids, sulfur dioxide and carbon dioxide are preferred, and the most preferred is carbon dioxide.

Procedures for preparing basic alkali and alkaline earth metal salts of alkyl phenols involving steps (A) and (B) of the present invention are well known in the art, and it is not believed necessary to unduly lengthen the specification with additional description of the procedures. The procedures known in the art can be utilized so long as the steps are conducted in the absence of free oxygen. Examples of patents which describe the preparation of basic metal phenates include, for example, U.S. Pat. Nos. 2,989,463; 2,968,642; and 2,971,014, the specifications of which are hereby incorporated by reference for the disclosures of the preparation of overbased metal phenates.

The preparation of the basic salts of monocarboxylic acids utilizing (A-2) and (B) also is well known and different procedures have been described in the prior art such as in U.S. Pat. Nos. 3,194,823 and 3,147,232, the disclosures of which are hereby incorporated by reference for their description of such procedures.

The third step in the process of the present invention involves (C) treating the mixture with at least one compound capable of displacing the hydrogen of the phenolic hydroxyl groups present in the mixture in the absence of free oxygen. Examples of compounds which are capable of displacing the hydrogen of the phenolic hydroxyl groups present (as well as any alcoholic hydroxyl groups present) include, for example, epoxy compounds, phosgene, diazomethane, alkali metal alkoxides, metal sulfoxides, carbonates and isocyanates. It has been observed that when the phenol-containing products are treated in this manner, improved color and color stability is obtained. The amount of such compounds which are reacted with the phenol-containing basic products preferably is an amount which is sufficient to react and displace all of the hydrogens on the phenolic hydroxyl groups present in the mixture, and an excess is generally utilized since the compounds can also react with the hydrogen of the alcoholic hydroxyl groups present.

Preferably, the basic compositions obtained in step (B) of the present invention are post-treated with at least one epoxide. Although any epoxide compound which is capable of reacting with the hydrogen atom of the phenolic hydroxyl group can be utilized beneficially, it is generally preferred that the epoxide be a low molecular weight epoxide such as ethylene oxide, propylene oxide, butylene oxide, epichlorohydrin, butyl eopxy stearate, glycidyl methacrylate, etc. Particularly preferred are the lower alkyl epoxides containing 7 carbons or less and especially ethylene and propylene oxides.

The reaction between the compound capable of displacing hydrogens of the phenolic hydroxyl group such as the epoxides, and the basic compositions containing phenol generally is carried out at about from ambient temperature to about 200° C. The most convenient method is to introduce the epoxide gradually into the basic composition which is usually dissolved in a suitable non-polar solvent such as mineral oil, kerosene, or the like while excluding free oxygen.

The following examples illustrate the preparation of the basic alkaline earth metal salts in accordance with the method of the present invention. Unless otherwise indicated in the following examples and elsewhere in the specification and claims, all parts and percentages are by weight, and all temperatures are in degrees centigrade.

EXAMPLE 1

A mixture of 165 parts of commercially available mixture of aliphatic alcohols containing 12 to 18 carbon atoms, 141 parts of nonylphenol and 600 parts of mineral oil is prepared and purged with nitrogen to remove any oxygen present in the system. The nitrogen purge is maintained throughout the entire process. After a period of about 20 minutes, the mixture is heated while stirring to a temperature of from about 90° C. to about 98° C. At this temperature, 1200 parts of barium hydroxide monohydrate are added incrementally over a 30-minute period and the temperature of the mixture is then increased to about 150°–155° C. while removing any water which is driven off during the heating. Oleic acid (258 parts) is then added over a 30–40 minute period while again removing the water of reaction which comes over. After all of the oleic acid is added, the mixture is treated with carbon dioxide at a rate of about 2 SCFH for approximately 4 hours to reduce the titratable basicity of the mixture is about 8.

The carbon dioxide feed is then stopped while maintaining the nitrogen purge for an additional 30 minutes to dry the mixture. Propylene oxide (73 parts) is then passed into the mixture over a period of about 30–40 minutes while maintaining the temperature of the reaction mixture at about 150° C. The mixture then is filtered hot (about 125° C.) with a filter aid, and the filtrate is the desired product characterized by a base number of 10 and a barium content of 35%. The ASTM color (DD1500) is found to be less than 1.5.

EXAMPLE 2

The general procedure of Example 1 is repeated utilizing 325 parts of the alcohol mixture containing from 12 to 18 carbon atoms, 675 parts of a tall oil fatty acid, 1870 parts of mineral oil, 1840 parts of barium hydroxide monohydrate, and 281 parts of nonylphenol. At the end of the carbonation, the filtrate is adjusted with mineral oil to provide an intermediate product containing 20.6% barium and a sulfate ash of 35.0%. This intermediate product is then treated with propylene oxide as in Example 1.

EXAMPLE 3

In this example, samples are taken of the reaction mixture after increasing amounts of propylene oxide have been introduced, and the various samples are observed for absorbance and ASTM color on oxidation.

A mixture of 2112 parts of mineral oil and 580 parts of a commercially available mixture of aliphatic alcohols containing an average of from 12 to 18 carbon atoms is prepared and purged with nitrogen for 30 minutes with stirring, and a nitrogen purge is maintained until carbonation begins. The mixture is heated to about 95° C. whereupon 4220 parts of barium hydroxide monohydrate are added slowly over a period of 5 to 10 minutes. The mixture then is heated to about 150° C. whereupon 496 parts of nonylphenol and 908 parts of oleic acid are added slowly over a period of 45 minutes. The mixture then is treated with carbon dioxide at a rate of about 10 SCFH for 3.5 hours through a titratable basicity of 8. The carbon dioxide feed is stopped, the nitrogen purge is resumed, and propylene oxide is added in amounts specified in the following table via nitrogen sweep with sub-surface feed while maintaining a temperature of about 150° C. Samples of the mixture are withdrawn after each propylene oxide addition for oxidation testing. At the end of the reaction, the mixture is filtered while hot. The final filtered product contains 34% barium and has an ASTM color of less than 1.5.

The observations on the samples taken during the propylene oxide addition for oxidation testing are summarized in the following Table I.

TABLE I

| Wt. of PrO Added (g) | Absorbance[1]/ASTM Color on Oxidation[2]/min | | | | | | |
|---|---|---|---|---|---|---|---|
| | 0 | 10' | 20' | 30' | 60' | 90' | 120' |
| 0 | 0.035 | 0.261 | 0.464 | 0.659 | 1.619 | 2.186 | O.S.[3] |
| | <0.5 | <1.5 | <2.5 | <3.0 | <4.5 | 5.0 | 6.0 |
| 192 | 0.031 | 0.139 | 0.218 | 0.298 | 0.578 | 0.819 | 0.878 |
| | <0.5 | <0.5 | <1.5 | <2.0 | <3.0 | 3.0 | 3.0 |
| 57 | 0.029 | 0.079 | 0.117 | 0.140 | 0.291 | 0.434 | 0.436 |
| | <0.5 | <0.5 | 0.5 | 4.0 | <2.0 | <2.0 | <2.0 |
| 49 | 0.034 | 0.063 | 0.078 | 0.085 | 0.183 | 0.227 | 0.259 |
| | <0.5 | <0.5 | <0.5 | <0.5 | <1.5 | <2.0 | <2.0 |
| 32 | 0.040 | 0.081 | 0.086 | 0.087 | 0.138 | 0.175 | 0.185 |
| | <0.5 | <0.5 | <0.5 | <0.5 | <1.0 | 1.0 | <1.5 |

[1]Measured using spectrometer. Lower numbers mean clearer product, light transmitted.
[2]Heated 400 g. sample to 150° C. (300° F.) and bubbled oxygen through sample for stated time at 2.0 SCFH. ASTM Test DD-1500 on scale of 0.5 to 8, 0.5 being lightest color.
[3]Off scale.

The basic alkali and alkaline earth metal salts prepared in accordance with the process of the present invention are readily adaptable for use as stabilizers in plastic formulations, especially vinyl halide polymers and copolymers. Because the basic alkali and alkaline earth metal compositions of the present invention are clear and generally light in color, they are particularly useful for preparing clear vinyl halide polymers and copolymers as well as other polymers such as polyethylene, polyisobutylene, polystyrene, copolymers of isobutylene with isoprene, butadiene, styrene and the like, etc.

Vinyl halide polymers and other halogen containing resins that can be stabilized with the basic alkali and alkaline earth metal salt composition of this invention include polyvinylchloride, polyvinylbormide, polyvinylfluoride, polyvinylidenechloride, chlorinated polyethylene, chlorinated polypropylene, brominated polyethylene, rubber hydrochloride, vinylchloridevinylacetate copolymer, vinylchloride-ethylene copolymer, vinylchhloride propylene copolymer, vinylchloridestyrene copolymer, vinylchloride-isobutylene copolymer, vinylchloride-vinylidenechloride copolymer, vinylchloride-styrene-acrylonitrile-terpolymer, vinylchloride-butadiene copolymer, vinylchloride-isoprene copolymer, vinylchloride-chlorinated propylene copolymer, vinylchloride-vinylidenechloride-vinylacetate terpolymer, vinylchloride-ethyl-acrylate copolymer, vinylchloride-maleate-copolymer, vinylchloride-methylmethacrylate copolymer, vinylchloride-acrylonitrile copolymer, internally plasticized polyvinylchloride, and blends of the above halogen-containing resin and alpha-olefin polymers. The terms "polyvinylchloride" and "vinyl chloride polymer" as used herein include any polymer formed at least in part of the recurring group,

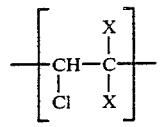

and having a chlorine content of excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor proportion, as already mentioned.

The invention also is applicable to mixtures of polyvinyl chloride in a major proportion with a minor proportion of other synthetic resins such as chlorinated polyethylene or copolymers of acrylonitrile with butadiene and styrene.

The stabilizing action of these compositions is enhanced by the use of additional polyvalent metal salts of carboxylic acids. The polyvalent metal salts which may optionally be used in addition to the above-described basic alkali or alkaline earth metal salts are most often neutral metal salts of cadmium, zinc, zirconium, tin, calcium, strontium, or mixtures thereof, the preferred salts being cadmium salts and mixtures of cadmium and zinc salts.

The optional polyvalent metal salts generally will be salts of aliphatic or benzenoid monocarboxylic acids. The useful aliphatic acids are straight-chain and branched-chain alkanoic acids having from 2 to about 22 carbon atoms and preferably from about 6 to about 12 carbon atoms. Examples of the preferred aliphatic acids are caproic acid, 2-ethylhexanoic acid, caprylic, neooctanoic acid, neodecanoic acid, pelargonic acid, lauric acid, palmitic acid, myristic acid, stearic acid, behenic acid, oleic acid, linoleic acid, etc. Examples of aromatic carboxylic acids that can be utilized in the formation of the polyvalent metal salts include benzoic acid, ortho-, meta-, and para-toluic acid, ortho-, meta-, and para-ethylbenzoic acid, ortho-, meta-, and para-, butylbenzoic acid, chlorobenzoic acid, bromobenzoic acid and hydroxy benzoic acid. When included in the stabilizer systems of this invention, the neutral polyvalent metal salts generally will be present in amounts from about 1% to about 20% by weight.

The stabilizing action of the basic metal salts prepared in accordance with this invention also can be enhanced by the use of one or more organic phosphite. The organic phosphites can be any organic phosphite having one or more organic groups attached to phosphorus through oxygen. More generally, the organic phosphite generally will be secondary or tertiary phosphites having 2 or 3 organic groups attached to the phosphorus through oxygen, and most often, these groups are monovalent groups. Thus, the phosphites may be secondary phosphites such as diaryl phosphites, aryl alkyl phosphites and dialkyl phosphites, or tertiary phosphites, such as trialkyl phosphites, triaryl phosphites, dialkyl monoaryl phosphites and monoalkyl diaryl phosphites. Also useful are cyclic phosphites derived from pentaerythritol and other neopentyl alcohols.

The basic alkali and alkaline earth metal salts prepared in accordance with the procedure of the present invention may be included in vinyl halide polymer compositions in an amount sufficient to provide the desired heat-stabilizing properties to the vinyl halide polymer by any suitable and convenient procedure. Such procedures include dry blending with a conventional mix such as a Henschel blender, mixing on a two or three roll heat mill, and tumbling. Generally, the basic salts are added in amounts to provide from about 0.1 to about 5% and more generally from about 0.1 to about 2% of the metal salt based on the weight of the vinyl halide polymer. The conventional additional additives may be included in amounts normally used in the art. For example, the neutral metal salts such as the cadmium carboxylate salts are included in an amount of from about 0.1 to about 3% by weight, and the other ingredients mentioned above may be each included in amounts of from zero to about 1% or more.

The utility of the metal salts prepared in accordance with the procedure of the present invention is demonstrated by the following example wherein the product of Example 1 is utilized as a stabilizer in the following vinyl halide formulations. In these examples, all of the ingredients are premixed except the resin, and the mixture then is mixed with the GEON 30 until uniform. The formulation is processed on a two roll mill for 10 minutes; the front roll is maintained at about 160° C. and the back roll at about 150° C.

|  | Ex. A | Ex. B |
|---|---|---|
| Ingredients (g) | | |
| GEON 30 | 200 | 200 |
| Dioctyl Phthalate | 100 | 100 |
| Stearic Acid | 0.5 | 0.5 |
| Prod. of Ex. 1 | 1.17 | 1.17 |
| Cd. octoate | 0.84 | 0.84 |
| Heat Stability* at 356° F. (180° C.) | | |
| Initial | clear | clear |
| 15 min. | clear | clear |
| 30 min. | v. sl. yel. | v. sl. yel. |
| 60 min. | sl. yel. | v. sl. yel. |

*Heat stability is run on 0.060" milled sheets of polymer in oven test.

I claim:

1. A process for improving the color and stability of basic alkali and alkaline earth metal salts groups present in the mixture in the absence of free oxygen wherein the compound (C) is selected from the group consisting of phosgene, diazomethane, metal sulfoxides, isocyanates and ether forming compounds.

2. The process of claim 1 wherein the amount of the compound in step (C) is an amount which is sufficient to react with substantially all of the phenol present in the mixture.

3. The process of claim 1 wherein the mixture is treated in step (C) with an epoxide.

4. The process of claim 1 wherein the process is conducted in an atomosphere of nitrogen.

5. The process of claim 1 wherein the metal base (A-1-1) or (A-2-1) is an alkaline earth metal.

6. The process of claim 5 wherein the alkaline earth metal base is a calcium or barium base.

7. The process of claim 1 wherein the acidic gas is sulfur dioxide or carbon dioxide.

8. The process of claim 1 wherein the acidic gas is carbon dioxide.

9. The process of claim 3 wherein the epoxide utilized in step (C) is ethylene oxide or propylene oxide.

10. The process of claim 3 wherein the epoxide utilized in step (C) is propylene oxide.

11. The process of claim 1 wherein the alkyl phenol (A-1-2) contains one or more alkyl group containing a total of at least 6 carbon atoms in the alkyl group.

12. The process of claim 1 wherein the mixture is treated with sulfur dioxide or carbon dioxide in step (B) until the base number of the mixture (phenolphthalein indicator) is below about 10.

13. The process of claim 1 wherein at least one aliphatic alcohol (A-2-4) is present in the mixture.

14. The process of claim 1 wherein alkaline earth metal base is a barium base.

15. The process of claim 1 wherein the monocarboxylic acid (A-2-3) is an aliphatic or alkyl aromatic monocarboxylic acid.

16. The process of claim 13 wherein the aliphatic alcohol (A-2-4) contains from one to about 30 carbon atoms.

17. A process for improving the color and stability of basic alkali or alkaline earth metal salts prepared from mixtures containing a phenol which comprises the steps of
(A) preparing, in the absence of free oxygen, a mixture of
(A-2-1) at least one alkali or alkaline earth metal base,
(A-2-2) at least one phenol,
(A-2-3) at least one aliphatic or alkyl aromatic monocarboxylic acid, and
(A-2-4) optionally at least one aliphatic alcohol, the ratio of equivalents of (A-2-3) to (A-2-2) being at least about 1.1:1, and the ratio of the equivalents of the metal base to the combination of the other components being greater than 1:1,
(B) heating said mixture in the absence of free oxygen to drive off at least some of the water which may be present,
(C) treating said mixture with carbon dioxide in the absence of free oxygen until the titratable basicity (phenolphthalein indicator) of the mixture has been substantially reduced, and
(D) treating the mixture with at least one compound capable of displacing the hydrogen of the phenolic hydroxy groups present in the mixture in the absence of free oxygen wherein the compound (C) is selected from the group consisting of phosgene, diazomethane, metal sulfoxides, isocyanates and ether forming compounds.

18. The process of claim 17 wherein the mixture is treated in step (D) with an amount of the compound which is sufficient to react with all of the alkyl phenol present in the mixture.

19. The process of claim 17 wherein the compound (D) is an epoxide.

20. The process of claim 19 wherein the epoxide is ethylene oxide or propylene oxide.

21. The process of claim 17 wherein the mixture is treated in step (C) with carbon dioxide until the base number of the mixture (phenolphthalein indicator) is below about 10.

22. The process of claim 17 wherein the metal base (A-2-1) is an alkaline earth metal base.

23. The process of claim 22 wherein the alkaline earth metal base is a barium base.

24. The process of claim 23 wherein the mixture is heated in step (B) to a temperature in excess of 100° C.

25. The process of claim 17 wherein the alkyl phenol (A-2-2) contains one or more alkyl groups containing a total of from about 6 to about 150 carbon atoms.

26. The process of claim 17 wherein the alkyl phenol (A-2-2) contains one alkyl group containing from about 6 to about 15 carbon atoms.

27. The process of claim 17 wherein the monocarboxylic acid (A-2-3) is an aliphatic monocarboxylic acid.

28. The process of claim 26 wherein the aliphatic monocarboxylic acid is a fatty acid.

29. The process of claim 26 wherein the aliphatic monocarboxylic acid contains an average of about 16 to about 20 carbon atoms.

30. The process of claim 17 wherein at least one aliphatic alcohol (A-2-4) is present in the mixture.

31. The process of claim 29 wherein the aliphatic alcohol contains from one to about 30 carbon atoms.

32. The process of claim 29 wherein the aliphatic alcohol contains from about 10 to 20 carbon atoms.

33. The process of claim 17 wherein the process is conducted in an atmosphere of nitrogen.

34. The process of claim 17 wherein the mixture is treated in step (D) at a temperature of from ambient temperature up to about 200° C.

35. A stabilizer composition prepared in accordance with the process of claim 1.

36. A stabilizer composition prepared in accordance with the process of claim 17.

37. A vinyl halide polymer composition comprising a vinyl halide polymer and a heat-stabilizing amount of the composition of claim 35.

38. A vinyl halide polymer composition comprising a vinyl halide polymer and a heat-stabilizing amount of the composition of claim 36.

* * * * *

UNITED STATES PATENT AND TRADEMARK OFFICE
CERTIFICATE OF CORRECTION

PATENT NO. : 4,665,117
DATED : May 12, 1987
INVENTOR(S) : Robert E. Quinn

It is certified that error appears in the above-indentified patent and that said Letters Patent is hereby corrected as shown below:

Column 12, line 58, the following should appear immediately after "alkaline earth metal salts":

--prepared from mixtures containing a phenol which comprises the steps of
    (A) preparing, in the absence of free oxygen, a mixture (A-1) comprising
        (A-1-1) at least one alkali or alkaline earth metal base, and
        (A-1-2) at least one alkyl phenol, the ratio of the equivalents of said alkali or alkaline earth metal base to the alkyl phenol being greater than 1:1, or a mixture (A-2) comprising
        (A-2-1) at least one alkali or alkaline earth metal base,
        (A-2-2) at least one phenol,
        (A-2-3) at least one monocarboxylic acid, and
        (A-2-4) optionally at least one aliphatic alcohol, the ratio of equivalents of monocarboxylic acid to phenol being at least about 1.1:1, and the ratio of equivalents of the metal base to the combination of the other components being greater than 1:1,
    (B) treating said mixture with an acidic gas in the absence of free oxygen until the titratable basicity (phenolphthalein indicator) of the mixture has been substantially reduced, and
    (C) treating the mixture with at least one compound capable of displacing the hydrogen of the phenolic hydroxyl--.

Signed and Sealed this

Twentieth Day of June, 1995

Attest:

BRUCE LEHMAN

*Attesting Officer*        *Commissioner of Patents and Trademarks*